United States Patent Office

3,360,532
Patented Dec. 26, 1967

3,360,532
N-(5′-ARYLTHIO-1′-ANTHRAQUINONYL)-1-AMI-
NO-2-ANTHRAQUINONE CARBOXAMIDE
Hans Altermatt, Reinach, Basel-Land, Switzerland, assignor to Ciba Limited, Basel, Switzerland, a Swiss company
No Drawing. Filed Sept. 1, 1964, Ser. No. 393,764
Claims priority, application Switzerland, Sept. 20, 1963, 11,642/63
3 Claims. (Cl. 260—368)

ABSTRACT OF THE DISCLOSURE

Anthraquinone compounds free from acidic groups imparting solubility in water, especially carboxylic acid and sulfonic acid groups, containing at least one arylmercapto group consisting of not more than 2 condensed carbocyclic rings, and in which an anthraquinone-β-carboxylic acid radical is bonded amide-like to an anthraquinonyl radical, particularly those compounds of the formula

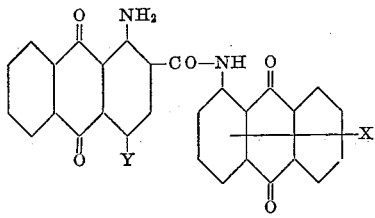

in which X represents an arylmercapto group consisting of not more than 2 condensed carbocyclic rings, Y represents a hydrogen atom or a cyano group or an aliphatic, aromatic or heterocyclic acylamino group, are valuable dyestuffs.

---

The present invention provides new, valuable anthraquinone dyestuffs free from acidic groups imparting solubility in water, especially carboxylic acid and sulfonic acid groups, which dyestuffs contain at least one arylmercapto group consisting of not more than 2 condensed carbocyclic rings, and in which an anthraquinone-β-carboxylic acid radical is bonded amide-like to an anthraquinonyl radical. The invention provides especially the new dyestuffs corresponding to the formula (1)

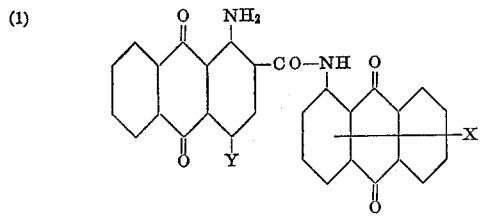

in which X represents an arylmercapto group consisting of not more than 2 condensed carbocyclic rings, Y represents a hydrogen atom or a halogen atom or a cyano group or an aliphatic, aromatic or heterocyclic acylamino group.

The term "arylmercapto group" as used herein refers especially to a phenyl-mercapto or naphthyl-mercapto group. The new dyestuffs advantageously correspond to the formula (2)

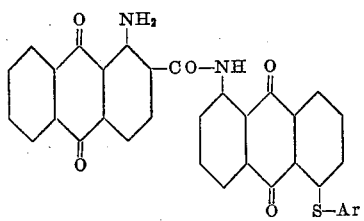

in which Ar represents a phenyl radical that may be substituted by halogen atoms or alkyl or phenyl groups, but is advantageously an unsubstituted phenyl radical.

The dyestuffs of the invention are obtained by condensing a derivative of an anthraquinone-β-carboxylic acid that is capable of acylating amino groups, for example, an acid anhydride, or more especially an acid halide, preferably an acid chloride, with the corresponding aminoanthraquinone that contains an arylmercapto group. Advantageously a compound of the formula (3)

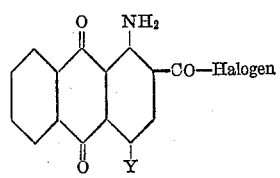

in which Y has the meaning given above, is condensed with a compound of the formula (4)

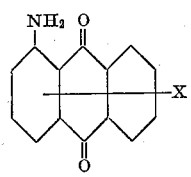

in which X has the meaning given above.

It is especially advantageous to produce the new dyestuffs by condensing 1-aminoanthraquinone-2-carboxylic acid chloride with an aminoanthraquinone of the formula (5)

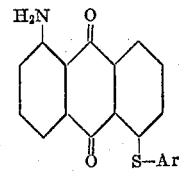

in which Ar represents a phenyl radical that may be substituted by halogen atoms or alkyl or phenyl groups.

As starting materials for the preparations of the new dyestuffs there may be mentioned, for example, the following anthraquinone-carboxylic acid derivatives: anthraquinone-2-carboxylic acid chloride, 1-aminoanthraquinone-2-carboxylic acid chloride, 1-amino-4-bromoanthraquinone-2-carboxylic acid chloride, and 1-amino-4-cyanoanthraquinone-2-carboxylic acid.

As aminoanthraquinones suitable for condensing with the above-mentioned anthraquinone carboxylic acid derivatives there may be mentioned, for example, 1-amino-4-phenylmercaptoanthraquinone,
1-amino-6-phenylmercaptoanthraquinone,
1-amino-7-phenylmercaptoanthraquinone,
1-amino-8-phenylmercaptoanthraquinone,
2-amino-5-phenylmercaptoanthraquinone,
2-amino-6-phenylmercaptoanthraquinone,
1-amino-4-(para-methylphenylmercapto)-anthraquinone,
1-amino-5-(para-methylphenylmercapto)-anthraquinone,
1-amino-4-(para-chlorophenylmercapto)-anthraquinone,
1-amino-5-(para-chlorophenylmercapto)-anthraquinone,
1-amino-5-2':5'-dichlorophenylmercapto)-anthraquinone,
1-amino-5-(2'-methyl-4'-chlorophenylmercapto)-anthraquinone,
1-amino-4-(1'-naphthylmercapto)-anthraquinone,
1-amino-4-(2'-naphthylmercapto)-anthraquinone,
1-amino-5-(orthofluorophenylmercapto)-anthraquinone,
1-amino-5-(meta-trifluoromethylphenylmercapto)-anthraquinone,
1-amino-5-(1'-naphthylmercapto)-anthraquinone,
1-amino-4-(8'-chloro-1'-naphthylmercapto)-anthraquinone,
1-amino-5-(8'-chloro-1'-naphthylmercapto)-anthraquinone,
1-amino-5:8-diphenylmercaptoanthraquinone,
and especially 1-amino-5-phenylmercaptoanthraquinone.

An advantageous method of carrying out the condensation process is to react the anthraquinone-carboxylic acid derivative with the corresponding aminoanthraquinone at raised temperature in an inert medium, for example, in nitrobenzene, chlorobenzene or dichlorobenzene, the reactants being dissolved or suspended therein, if desired or required, in the presence of a condensing agent, for example, copper chloride, or in the presence of an agent capable of binding acid, for example, pyridine or sodium carbonate.

Instead of the anthraquinone-carboxylic acid derivatives indicated above, it is also possible to use the corresponding anthraquinone-carboxylic acid itself in admixture with the aminoanthraquinone of the Formula 4, the reactants being heated in a solvent in the presence of, for example, thionyl chloride; in this process, the carboxylic acid chloride that is formed reacts with the aminoanthraquinone.

It is also possible to use 1-nitroanthraquinone-2-carboxylic acid chloride instead of 1-aminoanthraquinone-2-carboxylic acid chloride. When condensation is complete, the nitro group can be converted by known methods into an amino group, for example, by reduction with hydrosulphite or by reaction with ammonia. It is also possible to use the dyestuff containing the nitro group in the actual dyeing process, the nitro group being converted into an amino group by the action of the vat.

Instead of 1-aminoanthraquinone-2-carboxylic acid halide, it is also possible to use 1-chloroanthraquinone-2-carboxylic acid halide as starting material. When condensation is complete, the chlorine atom in 1-position can be converted into an amino group in known manner by reaction with ammonia or with arylsulfonamides.

Another method of carrying out the process of the invention is to introduce the arylmercapto group after condensation has taken place. This is done by reacting a dyestuff of the formula

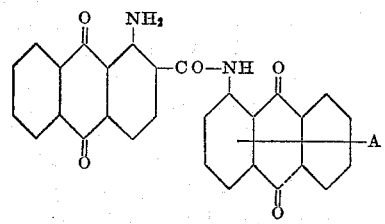

in which A represents a substituent that can be replaced by an arylmercapto group, for example, a nitro group or a halogen atom, with an aryl-mercaptan.

The dyestuffs of the present invention in which the symbol Y in Formula 1 represents an aliphatic, aromatic or a heterocyclic acylamino group can also be prepared by condensing a dyestuff of the formula

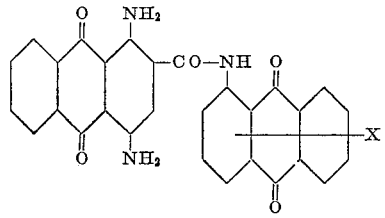

in which X has the meaning given above, with an aliphatic, aromatic or a heterocyclic carboxylic acid halide in the usual manner.

The dyestuffs obtained by the processes of the invention are suitable for dyeing and printing a very wide variety of materials, for example, synthetic or natural fibres, for example, fibers made of cellulose esters, polyesters, especially polyethylene terephthalates, polyamides, polyacrylonitrile, polyvinyl chloride, and wool and silk; they are specially suitable for dyeing and printing textile materials made from natural and regenerated cellulose, the dyeing operation being carried out by the usual vat-reduction process. They can also be used as pigments.

The dyeings obtained with the dyestuffs of the invention are distinguished by an excellent fastness to light and to wet treatments.

The following examples illustrate the invention. Unless otherwise stated, the parts and percentages are by weight.

*Example 1*

26.7 parts of 1-aminoanthraquinone-2-carboxylic acid and 8 parts by volume of thionyl chloride are stirred for ½ hour at 120° C. in 375 parts by volume of anhydrous nitrobenzene in the presence of 0.1 part by volume of pyridine. The solution of the acid chloride is cooled to 90° C., 33.1 parts of 1-amino-5-phenylmercapto-anthraquinone are added, and the batch is stirred for 3 hours at 140 to 145° C. After cooling the reaction mixture, the red crystals are isolated by filtration, freed from nitrobenzene with methanol and then dried.

The dyestuff of the formula

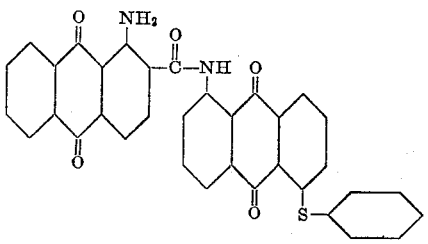

thus obtained dyes cotton yellowish red tints possessing excellent properties of wet fastness and an excellent fastness to light when applied by the vat method.

*Example 2*

29.7 parts of 1-nitroanthraquinone-2-carboxylic acid and 14 parts by volume of thionyl chloride are stirred for ½ hour at 120° C. in 350 parts by volume of anhydrous nitrobenzene in the presence of 0.1 part by volume of pyridine. Subsequently, the excess thionyl chloride is distilled off in a slight vacuum. The solution of the acid chloride is cooled to 90° C., 33.1 parts of 1-amino-5-phenyl mercapto-anthraquinone are added and then stirring is continued for 3 hours at 145° C. After cooling the reaction mixture, the orange crystalline mass is isolated by suction filtration and then freed from nitrobenzene with methanol. The orange dyestuff of the formula

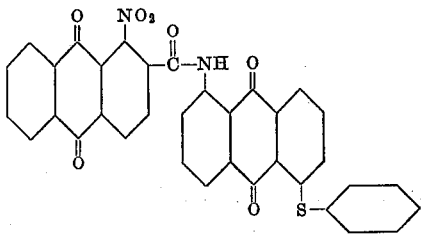

thus obtained dyes cotton yellowish red tints when applied by the vat method. The dyeing obtained corresponds in all respects to the dyeing obtained with the dyestuff described in Example 1.

Prior to dyeing, the nitro group can be converted into the amino group by known methods, for example, by reduction (re-vatting) or by reaction with ammonia.

*Example 3*

Analogous dyestuffs are obtained when, in the procedures described in Examples 1 and 2, the 33.1 parts of 1-amino-5-phenyl-mercapto-anthraquinone are replaced by the anthraquinone derivatives listed in Column II of the following table in the amounts (parts) indicated in Column I. The tints obtained (vat dyeing method) are shown in Column III.

| I | II | III |
|---|---|---|
| 33.1 | 1-amino-4-phenylmercaptoanthraquinone | Bluish red. |
| 33.1 | 1-amino-6-phenylmercaptoanthraquinone | Yellowish red. |
| 33.1 | 1-amino-7-phenylmercaptoanthraquinone | Do. |
| 33.1 | 1-amino-8-phenylmercaptoanthraquinone | Do. |
| 33.1 | 2-amino-5-phenylmercaptoanthraquinone | Do. |
| 33.1 | 2-amino-6-phenylmercaptoanthraquinone | Do. |
| 34.5 | 1-amino-4-(para-methylphenylmercapto)-anthraquinone. | Bluish red. |
| 34.5 | 1-amino-5-(para-methylphenylmercapto)-anthraquinone. | Yellowish red. |
| 36.5 | 1-amino-4-(para-chlorophenylmercapto)-anthraquinone. | Bluish red. |
| 36.5 | 1-amino-5-(para-chlorophenylmercapto)-anthraquinone. | Yellowish red. |
| 40.0 | 1-amino-5-(2':5'-dichlorophenylmercapto)-anthraquinone. | Do. |
| 40.0 | 1-amino-4-(2':5'-dichlorophenylmercapto)-anthraquinone. | Do. |
| 37.9 | 1-amino-5-(2'-methyl-4'-chlorophenylmercapto)-anthraquinone. | Do. |
| 38.1 | 1-amino-4-(1'-naphthylmercapto)-anthraquinone. | Bluish red. |
| 38.1 | 1-amino-4-(2'-naphthylmercapto)-anthraquinone. | Do. |
| 38.1 | 1-amino-5-(1'-naphthylmercapto)-anthraquinone. | Yellowish red. |
| 41.5 | 1-amino-4-(8'-chloro-1'-naphthylmercapto)-anthraquinone. | Bluish red. |
| 41.5 | 1-amino-5-(8'-chloro-1'-naphthylmercapto)-anthraquinone. | Yellowish red. |
| 43.9 | 1-amino-5:8-diphenylmercaptoanthraquinone | Red. |
| 34.9 | 1-amino-5-(ortho-fluorophenylmercapto)-anthraquinone. | Yellowish red. |
| 39.9 | 1-amino-5-(meta-trifluoromethylphenylmercapto)-anthraquinone. | Do. |

*Example 4*

34.6 parts of 1-amino-4-bromoanthraquinone-2-carboxylic acid and 8 parts by volume of thionyl chloride are stirred for ¾ hour at 120° C. in 350 parts by volume of anhydrous ortho-dichloro-benzene in the presence of 0.1 part by volume of pyridine. The solution of the acid chloride is cooled to 90° C., 33.1 parts of 1-amino-5-phenylmercaptoanthraquinone are introduced, and the batch is subsequently stirred for 3 hours at 140 to 145° C. After cooling the reaction mixture, the red crystalline mass is isolated by filtration and the presscake is thoroughly washed with methanol.

The dyestuff of the formula

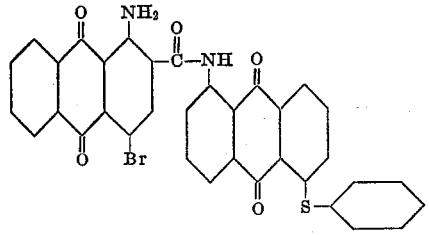

thus obtained dyes cotton yellowish red tints. The dyeing exhibits a very good fastness to wet treatments and to light. When the 34.6 parts of 1-amino-4-bromoanthraquinone-2-carboxylic acid are replaced by 29.3 parts of 1-amino-4-cyanoanthraquinone-2-carboxylic acid, a dyestuff is obtained that dyes cotton a bright orange tint when applied as a vat dyestuff.

The 33.1 parts of 1-amino-5-phenylmercaptoanthraquinone can be replaced by the appropriate amount of one of the aminoanthraquinones listed in the table in Example 3. When the 34.6 parts of 1-amino-4-bromoanthraquinone-2-carboxylic acid are replaced by 25.2 parts of anthraquinone-2-carboxylic acid, more yellowish dyestuffs are obtained that dye cotton yellowish red tints when applied by the vat-dyeing method.

*Example 5*

33 parts of 1-amino-4-nitroanthraquinone-2-carboxylic acid chloride and 33 parts of 1-amino-4-phenylmercaptoanthraquinone are stirred for 3 hours at 145° C. in 500 parts by volume of anhydrous nitrobenzene in the presence of 1 part by volume of thionyl chloride. After cooling the reaction mixture, the dark red crystalline mass is isolated by filtration and washed thoroughly with methanol.

20 parts of the moist presscake are stirred for 1 hour at 70° C. in 500 parts by volume of 1 N sodium hydroxide solution in the presence of 30 parts of hydrosulfite. After cooling the reaction mixture, air is passed through the solution until the precipitate that forms ceases to increase in quantity. The dark blue precipitate is isolated by filtration, washed thoroughly with water and then dried.

11.9 parts of the dyestuff so obtained are acylated for 1 hour at 160° C. with 2.5 parts by volume of benzoyl chloride in 175 parts by volume of anhydrous nitrobenzene. After cooling the reaction mixture, the dyestuff of the formula

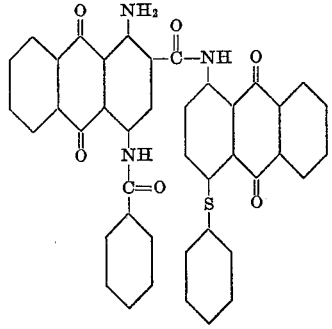

is isolated in the usual manner. It dyes cotton violet tints possessing good properties of wet fastness and a good fastness to light when applied by the vat-dyeing method.

*Example 6*

30.5 parts of 1-chloroanthraquinone-2-carboxylic acid chloride and 33.1 parts of 1-amino-5-phenylmercaptoanthraquinone are stirred at 140 to 145° C. in 350 parts by volume of anhydrous nitrobenzene until formation of the dyestuff is complete. The temperature is increased to 180° C. and ammonia gas is conducted through the mixture until the chlorine atom of the acyl group is replaced by an amino group. After cooling the reaction mixture, the precipitated dyestuff is isolated by suction filtration, and then washed successively and thoroughly with nitrobenzene and methanol. The red dyestuff thus obtained is identical with the dyestuff obtained in the manner described in Example 1.

*Example 7*

5.2 parts of the dyestuff of the formula

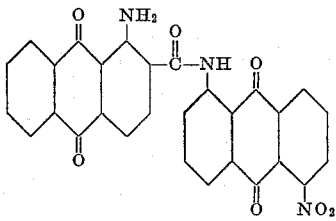

2 parts of thiophenol and 1 part of potassium carbonate are heated under reflux for 15 hours in 100 parts of amyl alcohol while stirring. After cooling the reaction mixture, it is filtered and the filter residue is washed successively with methanol and water. The dyestuff thus obtained corresponds to the dyestuff obtained in the manner described in Example 1.

What is claimed is:

1. An anthraquinone dyestuff of the formula

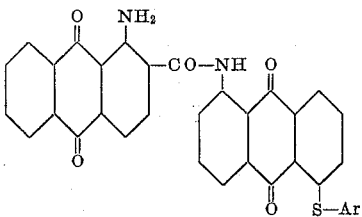

in which Ar represents a member selected from the group consisting of phenyl, halogen phenyl, methyl phenyl, trifluoromethylphenyl, diphenyl and naphthyl.

2. The compound of the formula

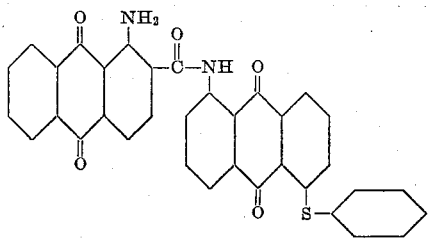

3. The compound of the formula

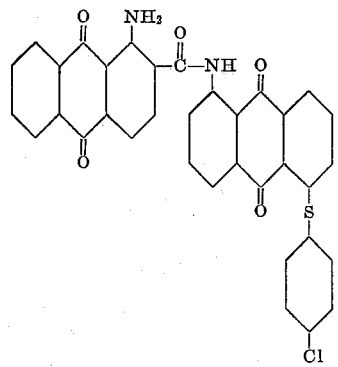

References Cited

UNITED STATES PATENTS

| | | | |
|---|---|---|---|
| 935,878 | 10/1909 | Wolman | 260—368 |
| 2,538,313 | 1/1951 | Holbro et al. | 260—368 |
| 3,054,795 | 9/1962 | Staeuble et al. | 8—34 |

FOREIGN PATENTS

| | | |
|---|---|---|
| 1,308,796 | 10/1962 | France. |
| 403,395 | 9/1924 | Germany. |

OTHER REFERENCES

Gattermann, Annalen, vol. 393, pp. 113–197 (pp. 113–118 and 125–131 particularly relied on) (1912).

LORRAINE A. WEINBERGER, *Primary Examiner.*

H. C. WEGNER, *Assistant Examiner.*